(12) United States Patent
Williamson et al.

(10) Patent No.: US 9,827,839 B2
(45) Date of Patent: Nov. 28, 2017

(54) TONNEAU COVER SYSTEM HAVING A LATCH

(71) Applicant: Rugged Liner, Inc., Owosso, MI (US)

(72) Inventors: Scott Williamson, Orlando, FL (US);
David Kosinski, Northville, MI (US);
Michael Yang, St. Charles, IL (US);
Xichang Yan, Jiangsu (CN); Jianfeng Tong, Jiangsu (CN); Chengping Wei, Jiangsu (CN)

(73) Assignee: Rugged Liner, Inc., Owosso, MI (US)

( * ) Notice: Subject to any disclaimer, the term of this patent is extended or adjusted under 35 U.S.C. 154(b) by 0 days.

(21) Appl. No.: 14/905,834

(22) PCT Filed: Oct. 30, 2015

(86) PCT No.: PCT/CN2015/093333
§ 371 (c)(1),
(2) Date: Jan. 18, 2016

(87) PCT Pub. No.: WO2016/066132
PCT Pub. Date: May 6, 2016

(65) Prior Publication Data
US 2016/0355078 A1     Dec. 8, 2016

Related U.S. Application Data

(60) Provisional application No. 60/073,230, filed on Oct. 31, 2014.

(51) Int. Cl.
*B60P 7/02*  (2006.01)
*B60J 7/19*  (2006.01)
*B60J 7/14*  (2006.01)

(52) U.S. Cl.
CPC ............... *B60J 7/198* (2013.01); *B60J 7/141* (2013.01)

(58) Field of Classification Search
CPC .................................. B60J 7/198; B60J 7/141
See application file for complete search history.

(56) References Cited

U.S. PATENT DOCUMENTS

| | | |
|---|---|---|
| 4,210,361 A | 7/1980 | Lohman et al. |
| 5,350,213 A | 9/1994 | Bernardo |
| (Continued) | | |

FOREIGN PATENT DOCUMENTS

| | | |
|---|---|---|
| CA | 2515165 A1 | 8/2004 |
| CA | 2823430 A1 | 2/2014 |
| WO | 2004071795 A2 | 8/2004 |

OTHER PUBLICATIONS

International Search Report and the Written Opinion of the International Searching Authority for PCT International Application No. PCT/CN2015/09333 dated Feb. 5, 2016.

*Primary Examiner* — Lori L Lyjak
(74) *Attorney, Agent, or Firm* — Harness, Dickey & Pierce, P.L.C.

(57) ABSTRACT

A tonneau cover system for a vehicle having a cargo box includes a striker which is adapted to be fixed to the cargo box along with a cover disposed over the cargo box when the cover is in a closed position. Moreover, the cover includes a latch mounted to the frame. The latch engages the striker when the cover is in the closed position. The cover further includes a link which extends from the latch along the frame and a handle coupled to the latch in order to move the latch into a released position which disengages the striker. Finally, the cover includes a coupler which is coupled to the handle. The coupler moves from a first position to a second position and responds to movement of the handle with the link moving relative to the frame in order to facilitate movement of the latch into the released position.

41 Claims, 14 Drawing Sheets

(56) References Cited

U.S. PATENT DOCUMENTS

| | | | |
|---|---|---|---|
| 5,480,206 A | 1/1996 | Hathaway et al. | |
| 6,203,086 B1 | 3/2001 | Dirks et al. | |
| 6,227,602 B1 | 5/2001 | Bogard | |
| 6,427,500 B1 | 8/2002 | Weinerman et al. | |
| 6,543,835 B2 | 4/2003 | Schmeichel et al. | |
| 6,607,234 B1 | 8/2003 | Schmeichel | |
| 6,672,644 B2 | 1/2004 | Schmeichel | |
| 6,814,389 B2 | 11/2004 | Wheatley | |
| 6,851,738 B1 | 2/2005 | Schmeichel et al. | |
| 6,883,855 B2 | 4/2005 | Chverchko et al. | |
| 6,913,303 B2 | 7/2005 | Kobiela et al. | |
| 7,052,071 B2 | 5/2006 | Mulder et al. | |
| 7,066,523 B2 | 6/2006 | Verduci et al. | |
| 7,066,524 B2 | 6/2006 | Schmeichel et al. | |
| 7,093,881 B2 | 8/2006 | Rusu | |
| 7,104,586 B2 | 9/2006 | Schmeichel et al. | |
| 7,165,803 B2 | 1/2007 | Malmberg et al. | |
| 7,188,888 B2 | 3/2007 | Wheatley et al. | |
| 7,252,322 B2 | 8/2007 | Rusu | |
| 7,334,830 B2 | 2/2008 | Weldy | |
| 7,384,090 B1 | 6/2008 | Weldy | |
| 7,472,941 B2 | 1/2009 | Schmeichel et al. | |
| 7,537,264 B2 | 5/2009 | Maimin et al. | |
| 7,621,582 B2 | 11/2009 | Schmeichel et al. | |
| 8,083,281 B2 | 12/2011 | Schmeichel et al. | |
| 8,182,021 B2 | 5/2012 | Maimin et al. | |
| 8,262,148 B2 | 9/2012 | Rusher et al. | |
| 8,328,267 B2 | 12/2012 | Schmeichel et al. | |
| 8,336,946 B2 | 12/2012 | Schrader et al. | |
| 8,511,736 B2 | 8/2013 | Williamson et al. | |
| 8,567,843 B2 | 10/2013 | Schmeichel et al. | |
| 8,814,249 B2 | 8/2014 | Rossi | |
| 8,857,887 B1 | 10/2014 | Schmeichel | |
| 9,045,069 B2 | 6/2015 | Schmeichel et al. | |
| 9,056,542 B2 | 6/2015 | Schmeichel | |
| 9,067,481 B2 | 6/2015 | Xu | |
| 9,254,735 B2 | 2/2016 | Spencer | |
| 9,260,139 B2 | 2/2016 | Schmeichel | |
| 2002/0096910 A1 | 7/2002 | Schmeichel et al. | |
| 2004/0245799 A1 | 12/2004 | Rusu | |
| 2007/0035151 A1 | 2/2007 | Rusu | |
| 2008/0129077 A1* | 6/2008 | Weldy | B60J 7/141 296/136.03 |
| 2010/0270824 A1* | 10/2010 | Yue | B60J 7/198 296/100.07 |
| 2014/0042754 A1 | 2/2014 | Spencer | |
| 2014/0375077 A1 | 12/2014 | Schmeichel | |
| 2015/0001877 A1 | 1/2015 | Fink | |
| 2015/0246602 A1 | 9/2015 | Schmeichel et al. | |

* cited by examiner

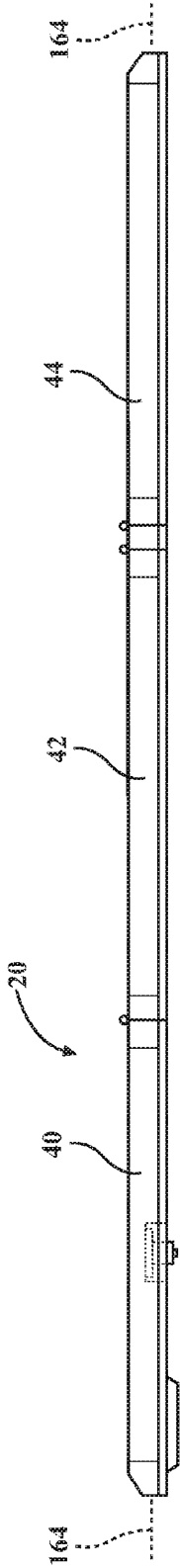
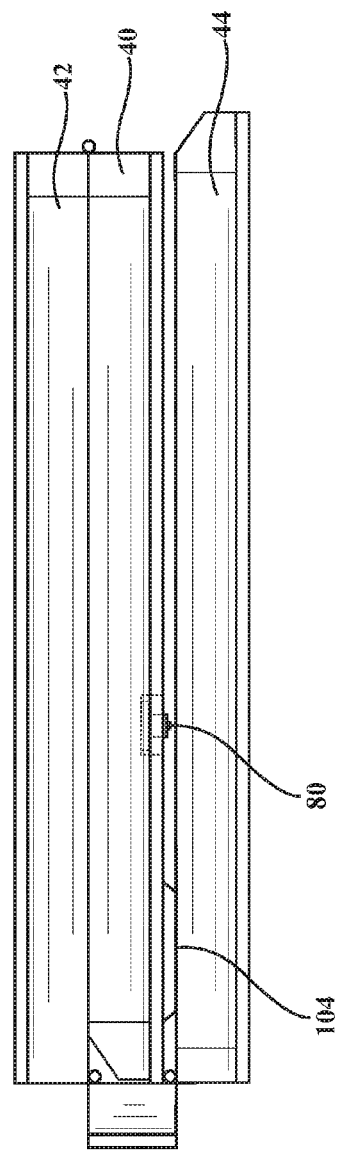

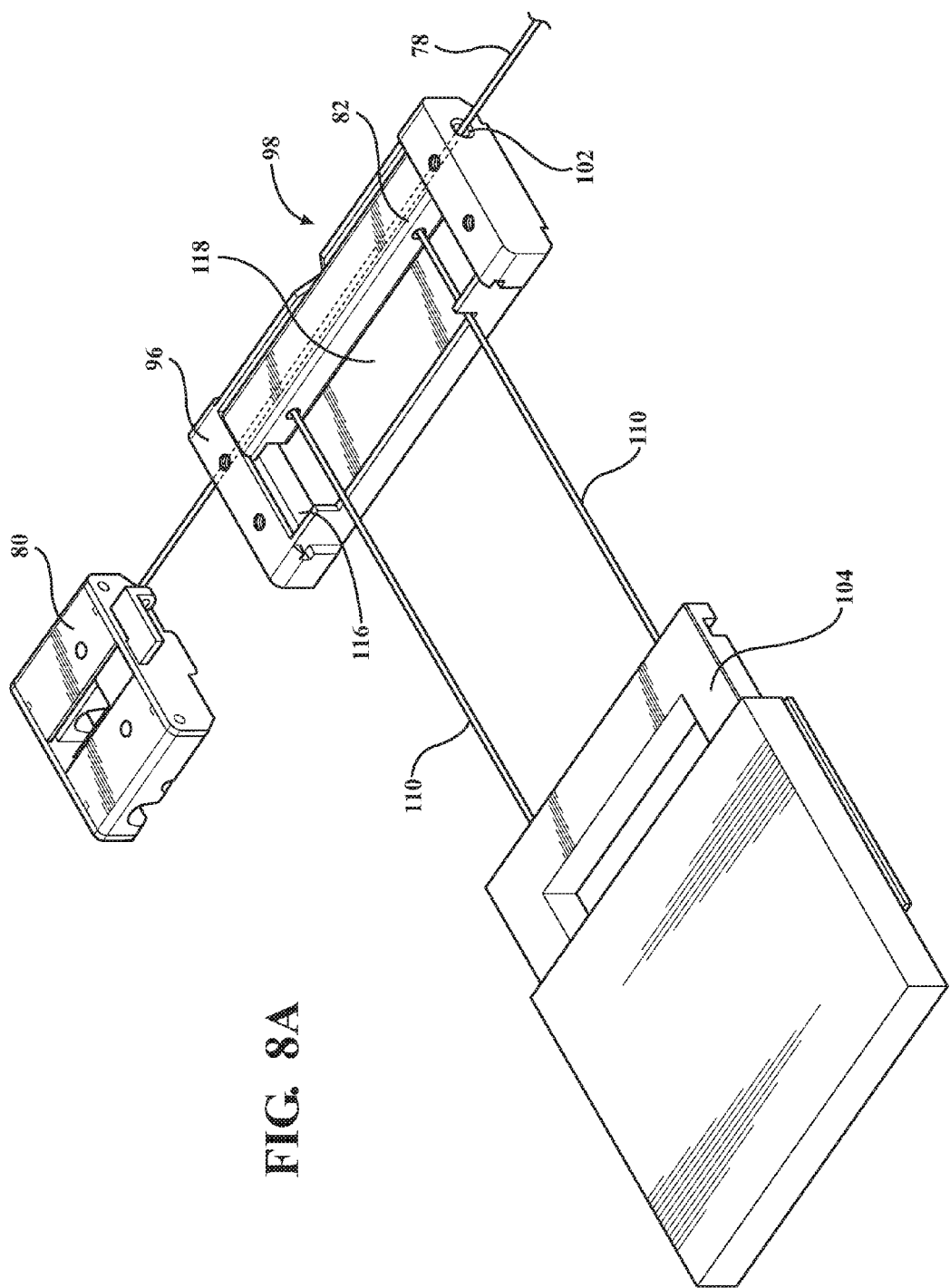

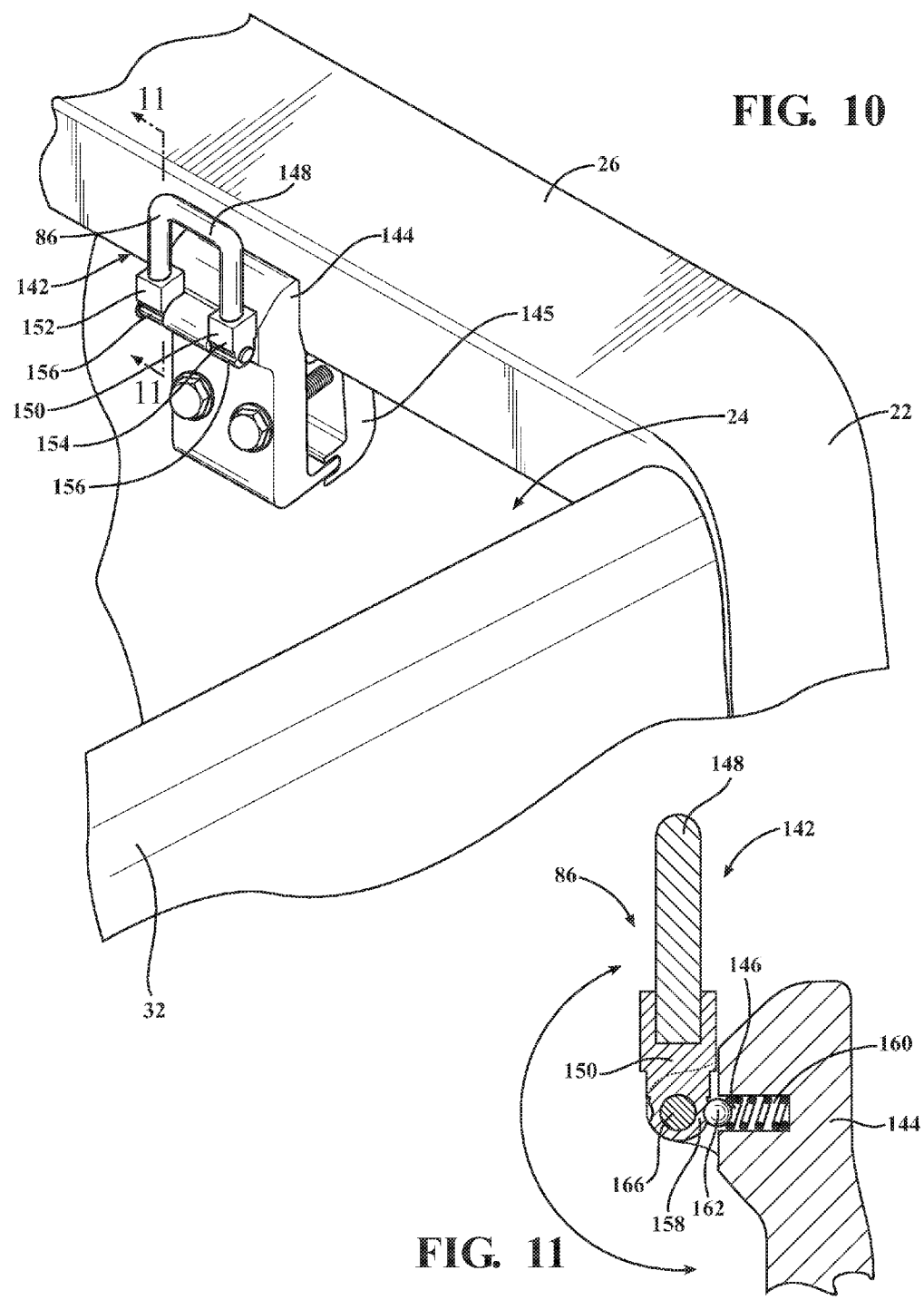

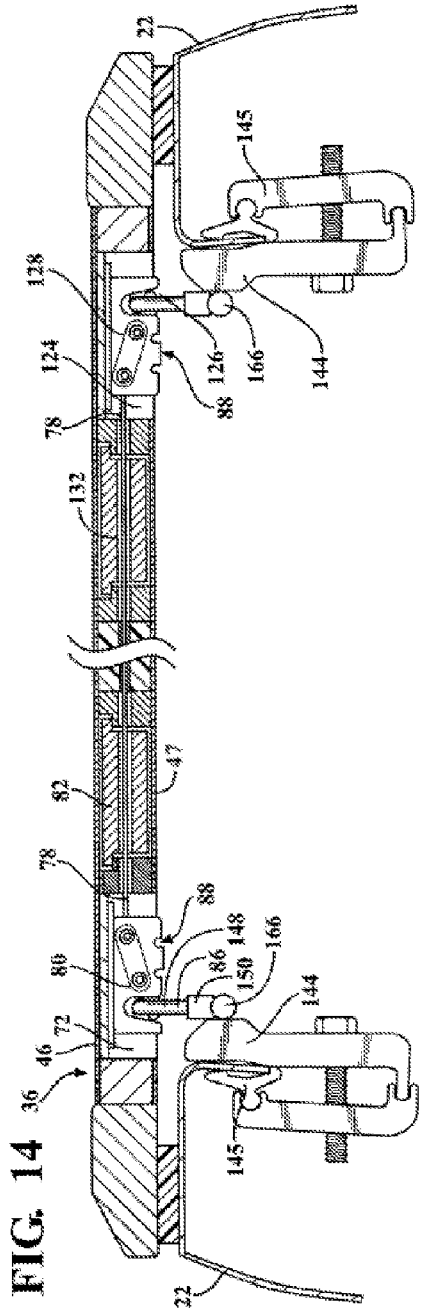
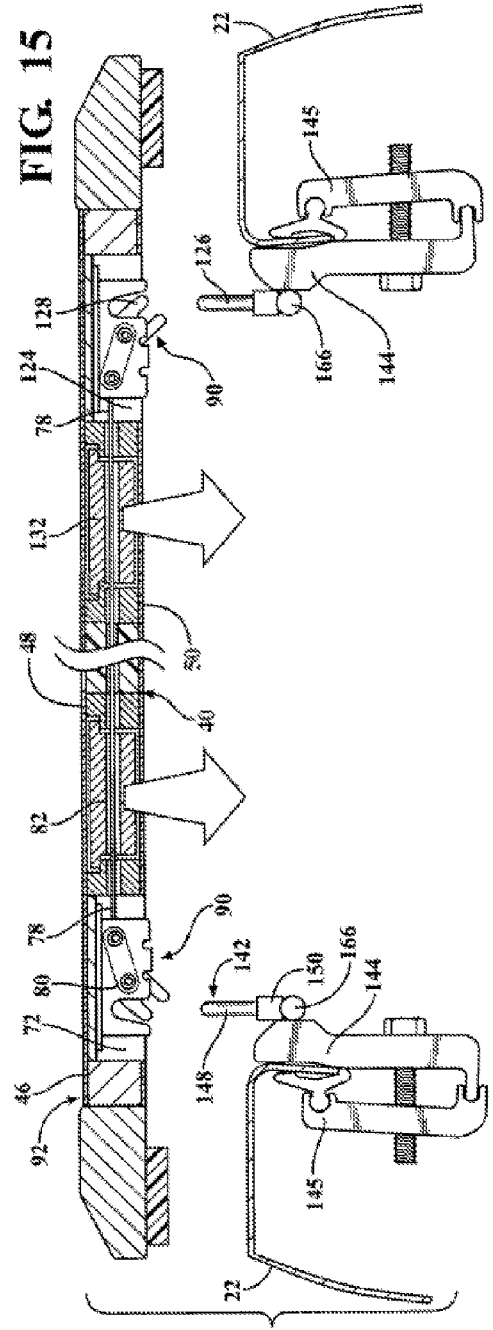

TONNEAU COVER SYSTEM HAVING A LATCH

RELATED APPLICATIONS

This application is a National Stage of International Patent Application No. PCT/CN2015/093333, filed Oct. 30, 2015, which claims priority to and the benefit of U.S. Provisional Patent Application No. 62/073,230, filed on Oct. 31, 2014, the entirety of which is incorporated by reference.

FIELD OF THE INVENTION

The present invention generally relates to a protective cover for covering a cargo space, more specifically, a tonneau system for securing the protective cover over the cargo space.

BACKGROUND

Protective covers having a frame and material covering the frame are well known for protecting spaces such as trailers, wagons, boats, as well as the cargo area of a pick-up truck. The frame usually includes a rigid material or semi-rigid material which may be disposed about the perimeter of the cargo area of the pick-up truck when the protective cover is closed. A variety of methods to secure and unsecure the cover over the cargo space have been employed.

In the past, various latch mechanisms have been directly attached to an inside surface of the protective cover. Although effective, this method may result in debris or liquid being disposed on the latch and in turn lessening the effectiveness of the latch over time. Additionally, various handle mechanisms have been employed including a strap directly attached or wrapped around a cable for pulling the cable to release the cover from the cargo box. Although effective, this method may result in the strap or cable getting caught or tangled in the cargo box resulting in an inadvertent release of the cover.

Although the prior art protective covers teach various methods of securing and releasing the cover to and from the cargo box, there remains an opportunity for a system which provides protection from liquid and other debris along with a user friendly latch system to couple and uncouple the cover from the cargo box.

SUMMARY OF THE INVENTION AND ADVANTAGES

The present invention provides a tonneau cover system for a vehicle having a cargo space. The assembly includes a striker, which is adapted to be fixed to the cargo box. The system further includes a cover which is adapted to be disposed over and coupled to the cargo box when the cover is in a closed position. Additionally, the cover includes a rigid frame along with a latch mounted to the frame. The latch engages the striker when the cover is in the closed position to define a locked position of the latch. Additionally, the cover includes a link which extends from the latch along the frame and a handle which is coupled to the latch and moves the latch into a released position which disengages the striker. Moreover, the cover includes a coupler which is disposed about the link and coupled to the handle. The coupler moves from a first position to a second position in response to movement of the handle with the link moving relative to the frame to facilitate movement of the latch into the released position.

Moreover, the present invention provides a tonneau cover system for a vehicle having a cargo box. The system includes a cover which is disposed over and adapted to the cargo box when the cover is in a closed position. Additionally, a latch is coupled to the cover and a support housing is adapted to the cargo box. A striker is coupled to the support housing and the striker may be moved between an operating position where the latch engages the striker when the cover is in the closed position and a stowed position. Moreover, the system may include a biasing device which may be disposed between the support housing and the striker.

Additionally, a tonneau cover system for a vehicle having a cargo box having a striker adapted to be fixed to the cargo box. Additionally the system includes a cover adapted to be disposed over the cargo box when in a closed position. The cover includes a rigid frame and a latch mounted to the frame. The latch engages the striker when the cover is in the closed position to define a locked position of the latch. Additionally, the cover includes a handle coupled to the latch to move the latch into a released position disengaging the striker, a first sheet coupled to the frame defining a first plane, and a second sheet coupled to the frame defining a second plane with the planes defining a space there between. Moreover, the latch and the handle are completely disposed within the space between the planes.

Accordingly, the present invention provides a mechanism which provides ease of moving the cover from the closed position to an open position. Additionally, the present invention allows ease of use of a striker which can be stowed when desired by the user. Moreover, the present invention provides a latch system which endures the accumulation of debris and liquid on the cover.

BRIEF DESCRIPTION OF THE DRAWINGS

Other advantages of the present invention will be readily appreciated, as the same becomes better understood by reference to the following detailed description when considered in connection with the accompanying drawings.

FIG. 4 is a side view of the cover.

FIG. 6 is a side view of the cover in a fully folded position.

FIG. 8A is an opposite perspective view of the handle and the coupler in the first position.

FIG. 10 is an enlarged view of a striker in an operating position.

FIG. 11 is a side view of the striker taken along the line indicated in FIG. 10.

FIG. 14 is a partially cross-sectional end view of the cover in a closed position.

FIG. 15 is a partially cross-sectional end view of the cover in an open position.

Figures 16, 17:
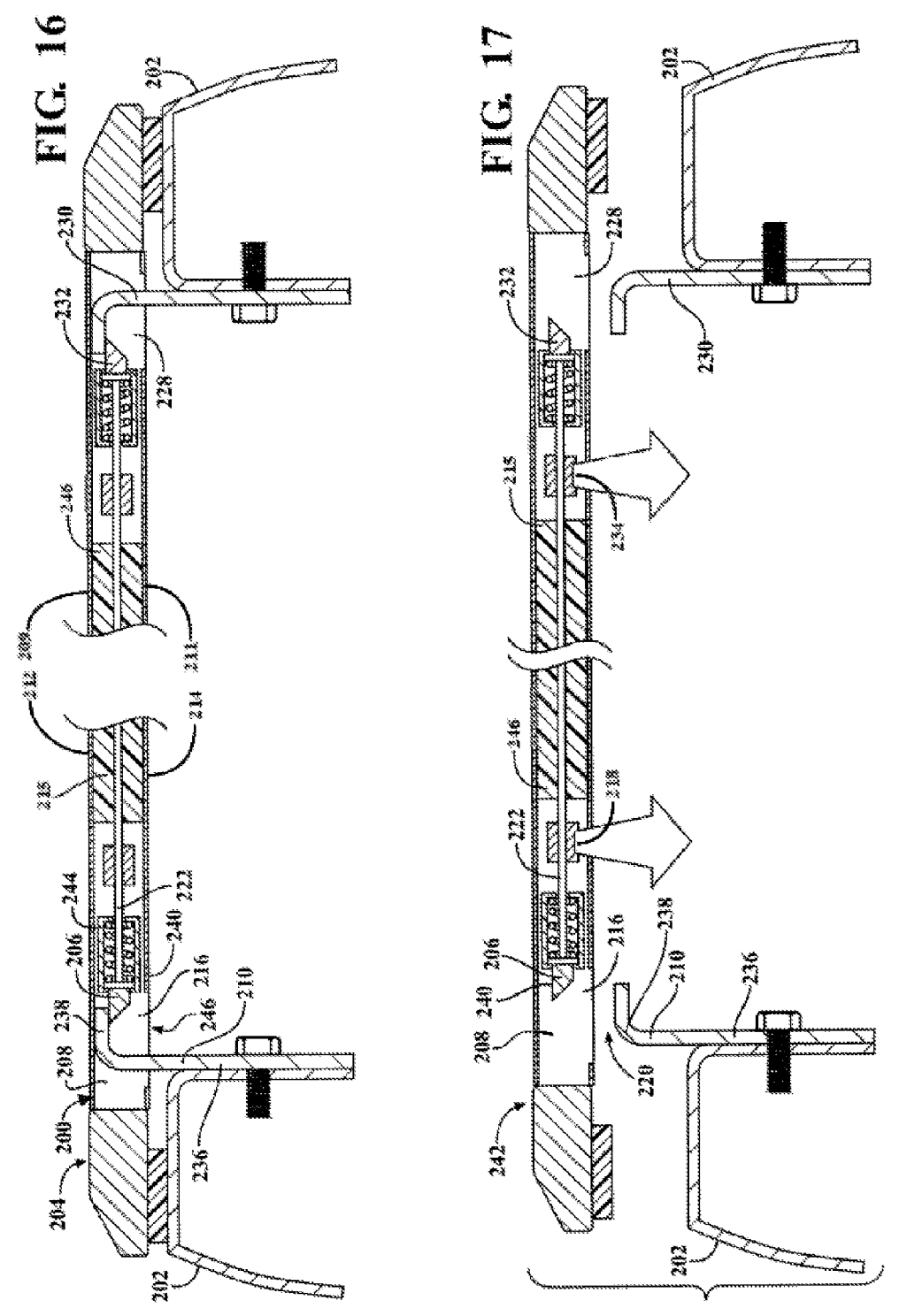

FIG. 16 is a partially cross-sectional end view of the cover in the closed position according to an alternate embodiment.

FIG. 17 is a partially cross-sectional end view of the cover in the open position according to the embodiment illustrated in FIG. 16.

DETAILED DESCRIPTION OF THE INVENTION

Figure 1:
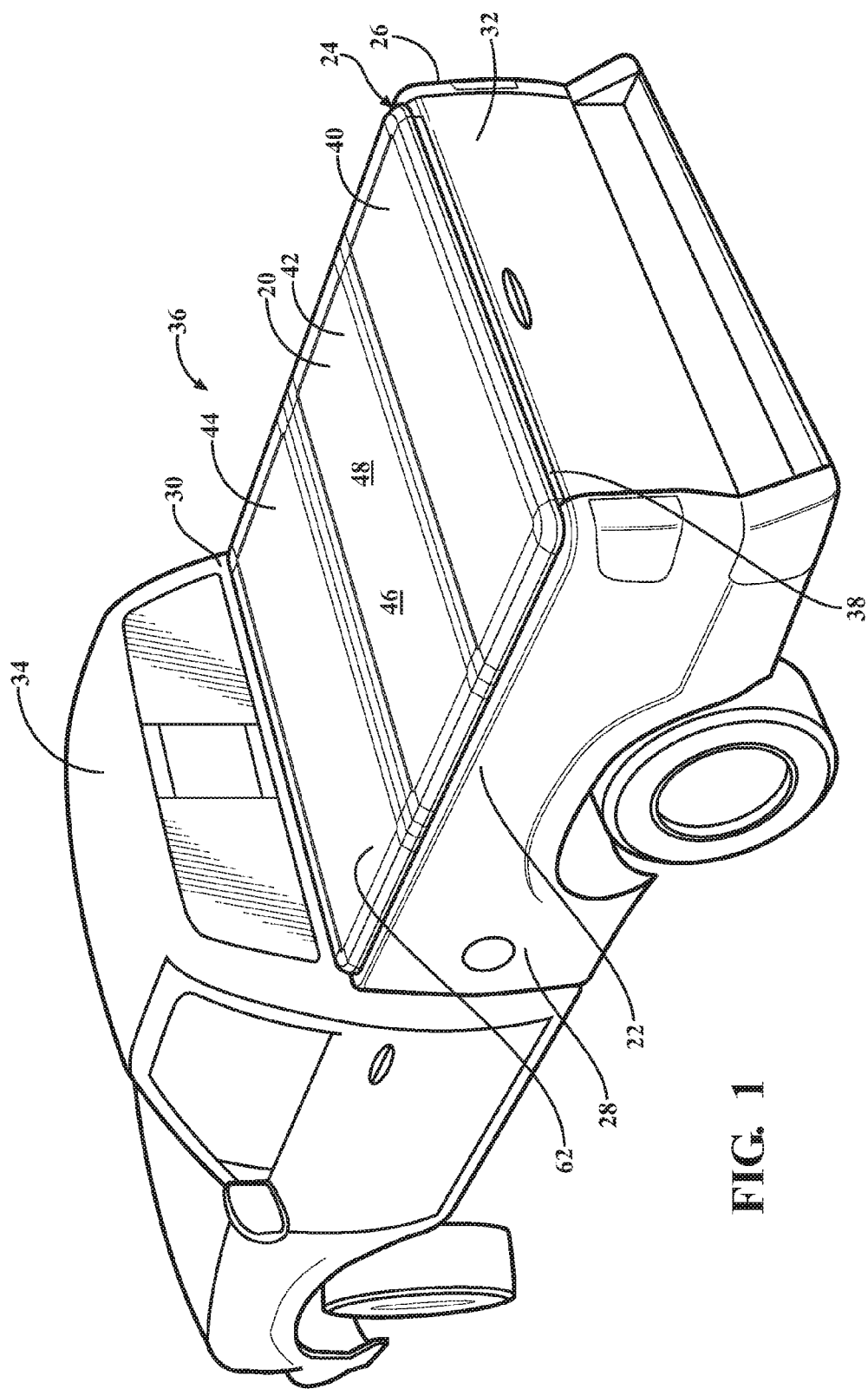
FIG. 1 is a perspective view of a pick-up truck with a cover covering a cargo area.

Referring to the figures, wherein like numerals indicate like or corresponding parts throughout the several views, a protective or tonneau cover is generally shown at 20. Referring to FIGS. 1 and 10-13, the cover 20 may be adapted to be coupled to a cargo box 22 which defines a cargo space 24. The cargo box 22 may include walls which may include a right side wall 26 and a left side wall 28 with the left side wall 28 spaced from and substantially parallel to the right side wall 26. The walls further include a front wall 30 and a rear wall 32, where the rear wall 32 is spaced from and substantially parallel to the front wall 30. Typically, the front wall 30 and the rear wall 32 are substantially perpendicular to the right side wall 26 and the left side wall 28. The cargo space 24 defined by the walls may be a cargo bed of the pick-up truck as illustrated in FIG. 1 such that the rear wall 32 is a tailgate and the front wall 30 engages a cab 34 of the pick-up truck. However, the subject invention is not limited to such an application.

As best shown in FIG. 1, the cover 20 is adapted to be disposed on the walls defining the cargo space 24. The cargo space 24 is typically covered completely by the cover 20 when the cover 20 is in a closed position 36, as illustrated in FIG. 1. The cover 20 may also include a seal 38 which is disposed over the rear wall 32 when the cover 20 is in the closed position 36.

Figure 2:
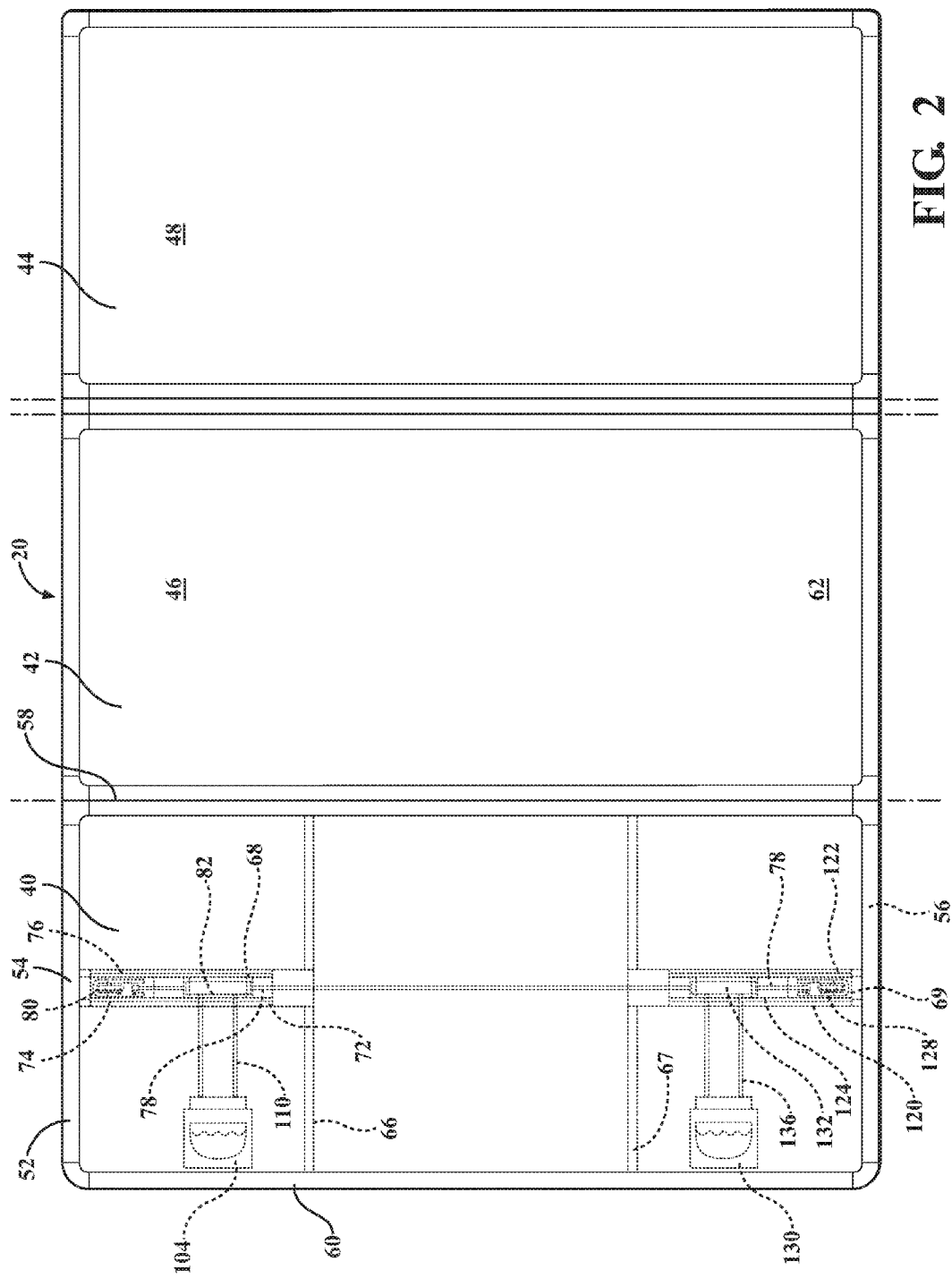
FIG. 2 is a top plan view of the cover showing two rails of the front panel in phantom lines.
Figure 3:
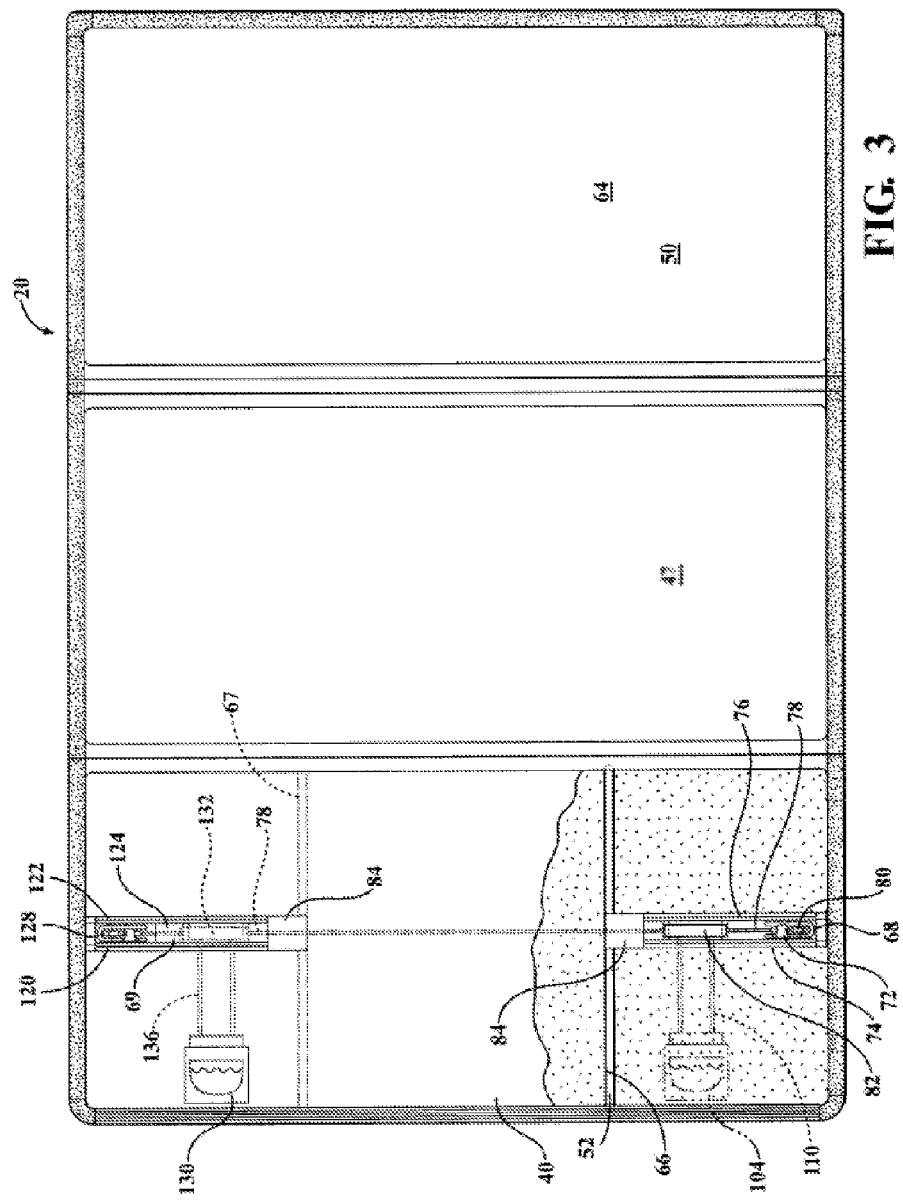
FIG. 3 is a bottom plan view of the cover with a portion of one of the sheets being fragmented.

Referring now to FIGS. 2 and 3, it is contemplated that the cover 20 may have at least one portion and as illustrated in FIGS. 2 and 3 may have a first portion 40, a second portion 42, and a third portion 44. The first portion 40 may be disposed adjacent to the rear wall 32 when the cover 20 is in the closed position 36, while the third portion 44 may be positioned adjacent to the front wall 30 when the cover 20 is in the closed position 36. Moreover, the second portion 42 may be disposed in between the first portion 40 and third portion 44. It is contemplated that the cover 20 may be a substantially rigid cover or may be any other cover as known by one of ordinary skill in the art including but not limited to a soft folding or roll-up cover. It is contemplated that each of the first 40, second 42 and third portions 44 of the cover 20 include a first sheet 46 and a second sheet 47. The first sheet 46 and the second sheet 47 have a space there between and at least partially define a cavity 49. The first sheet 46 and the second sheet 47 are disposed substantially parallel to one another and the cavity 49 is disposed therebetween. Each sheet 46, 47 has a composite structure that is durable and lightweight, and imparts rigidity to the cover 20 for protecting the cargo space 24 within the cargo box 22. In the illustrated embodiment, the first sheet 46 and the second sheet 47 respectively define at least a portion of the exterior surface 48 and bottom or interior surface 50 of the cover 20. It is contemplated that the exposed surfaces of the first sheet 46 and the second sheet 47 may be textured and/or colored.

The cover 20 also includes a rigid frame 52 which may include a plurality of extruded aluminum frame members. The frame members bound respective sheet members and form a substantially rectangular periphery of the cover 20. The frame 52 may include at least left side 54 and right side 56 frame members along with a front frame member 58 and a rear frame member 60 which are formed together to produce a substantially rectangular frame which at least partially define the first portion 40 of the cover 20. The corners between adjacent frame members of each portion may be defined by a molded plastic right angle connector member through which the frame members of the portions are interconnected and affixed to each other. The cover 20 may also include inside corner connectors which may connect the individual first 40, second 42, and third 44 portions to one another.

Each of the first 40, second 42 and third 44 portions and the cover 20 itself have opposed first 62 and second 64 sides, which respectively face interiorally and exteriorally relative to the cargo box 22 when the cover 20 is unfolded and in the closed position 36, thereby enclosing the cargo space 24 within the cargo box 22. When the cover 20 is in the closed position 36, the first exterior side 62 generally faces in the direction normally away from the second side 64.

Referring still to FIGS. 2 and 3, the frame 52 may also include a first support rail 66 and a second support rail 67 disposed on the first portion 40. The first support rail 66 and the second support rail 67 are laterally spaced relative to the cover 20 towards the opposite left 54 and right frame 56 members respectively and are partially visible only on the interior side 50 of the cover 20. The support rails 66, 67 are typically completely hidden between the first sheet 46 and the second sheet 47 on the cover exterior 48. However, it is contemplated that at least a portion of the support rails 66, 67 may be visible to a user. The frame further defines a first track 68 and a second track 69 interconnected to the first support rail 66 and the second support rail 67.

The first track 68 and the second track 69 extend from the right 56 and left side frame member 54 respectively of the first portion 40. As illustrated in FIGS. 2 and 3, each of the first track 68 and the second track 69 are located equidistantly between front 58 and rear frame members 60 of the first portion 40. It is also contemplated that the track 68 may be disposed closer to the front member 58 or the rear member 60 of the first portion 40.

Referring again to FIGS. 2 and 3, the frame 52 and specifically, the track 68 may at least partially define a cooperating pocket 72. The pocket 72 may be further defined such that the frame 52 may further include a first panel 74 and a second panel 76 which further define the pocket 72. As further illustrated in FIGS. 2 and 3, a link 78, latch 80 and a coupler 82 may be at least partially disposed within the pocket 72 or may be completely disposed within the pocket 72. The first panel 74 and the second panel 76 may be disposed perpendicular to the track 68 such that the pocket 72 includes a depth in order to receive at least part of the system including but not limited to the latch 80, the link 78 and the coupler 82. In FIGS. 2 and 3, the latch 80, the link 78, and the coupler 82 are disposed on the first section 40 of the cover 20. It is also contemplated that the latch 80, the link 78, and the coupler 82 are disposed on the second section 42 of the cover 20. Moreover, the latch 80 and the coupler 82 are disposed between the first support rail 66 and the left side rail 54.

Figure 5:
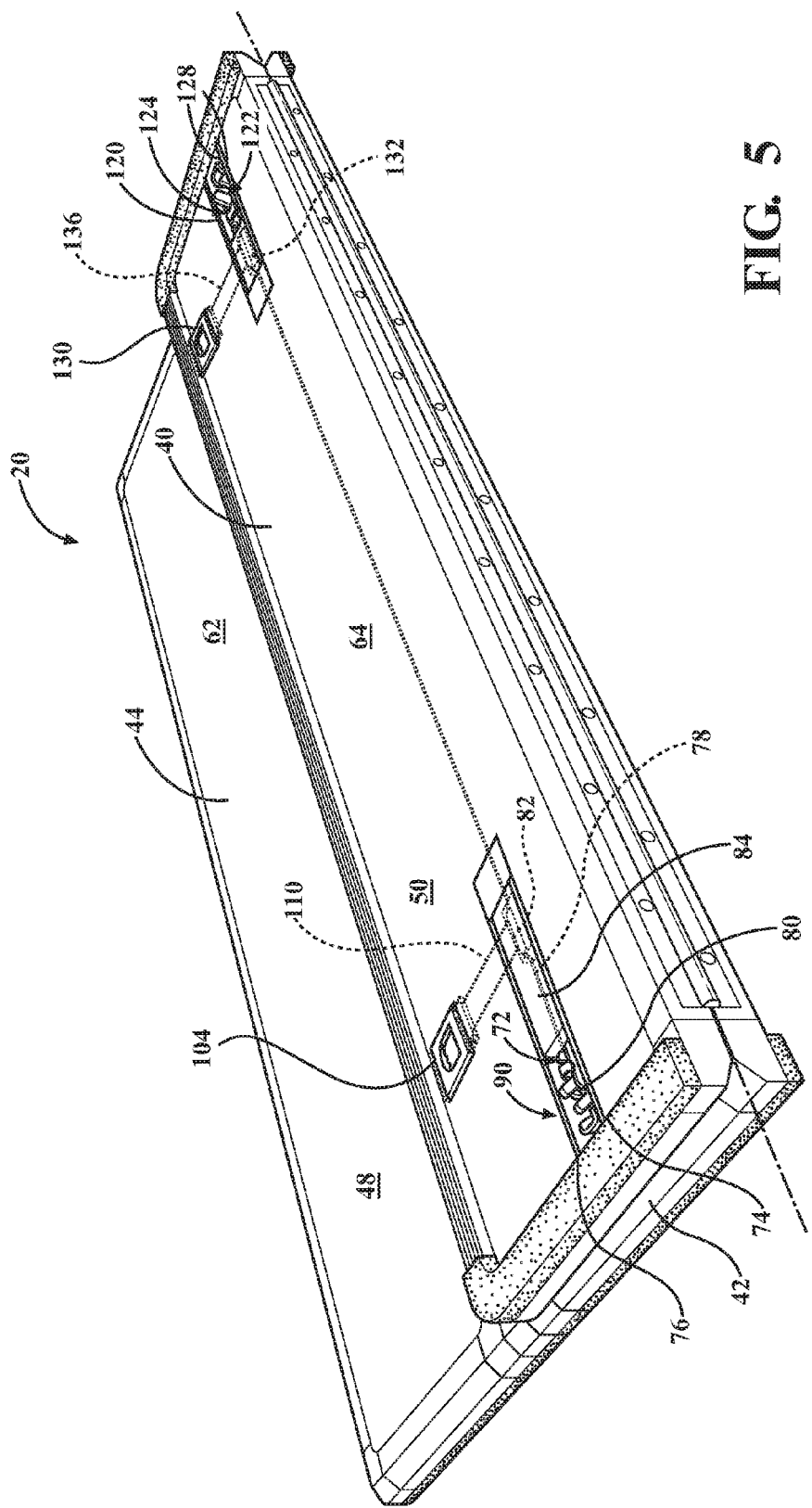
FIG. 5 is an upper perspective view of the protective cover of FIG. 1, in a partially folded position.

As illustrated in FIG. 5, the cover 20 may additionally include at least one lid, which may be disposed over at least a portion of the pocket 72. It is contemplated that the lid may enclose one or more of the latch 80, link 78 and the coupler within the pocket 72.

Referring now to FIGS. 2 to 5, the cover 20 includes at least the latch 80, the link 78 and the coupler 82. The latch 80 may be mounted to the frame 52 and additionally engages a striker 86 (see FIG. 14) when the cover 20 is in the closed position 36 to define a locked position 88 of the latch 80. When the latch 80 is mounted to the frame, the mounting hardware may allow horizontal and/or vertical adjustment in order to move the latch 80 in a desired position to engage the striker 86. The striker 86 may be any type of striker as known by one of ordinary skill in the art, including a straight striker or a curved striker, where the striker is configured to engage the latch 80. It is also contemplated that the striker 86 may be similar or identical to the striker shown in the embodiment illustrated in FIGS. 10-13 described in further detail below.

As additionally illustrated in FIGS. 2 to 5, the latch 80 may be at least partially disposed within the pocket 72 and may be completely disposed within the pocket 72. When the cover is in the closed position 36, the latch 80 engages the striker 86 (see FIG. 14) which securely couples the cover 20 to the cargo box 22. The latch 80 may be a slam latch 80, a rotary latch, a spring latch, a deadbolt latch, or any other latch as known by one of ordinary skill in the art, but illustrated in FIG. 5 is known in the art as a slam latch. The latch 80 may also be configured to move from the locked position 88 into a released position 90. In the released position 90, the latch 80 disengages the striker 86 and therefore allows the cover to be moved to an open position 92.

Moreover, as illustrated in FIGS. 2 to 5, the link 78 extends from the latch 80 along the frame 52. Specifically, the link 78 may couple to the latch 80 and then extend along the track 68 through the pocket 72. It is contemplated that the link 78 may be at least partially disposed or completely disposed within the pocket 72. It is additionally contemplated that the link 78 may be a cable or may be any other structure which may couple the latch 80 in order to move the latch 80 from the locked position 88 to the released position 90. Moreover, the link 78 may be formed of multiple pieces which are coupled together. In the embodiment shown, the link 78 is a cable having a conduit and a core element.

Referring still to FIGS. 2 to 5, the coupler 82 may be disposed about the link 78. The coupler 82 may also be disposed behind the lid 84 which may prevent debris or liquid from entering the pocket 72 and interfering with operation of the coupler 82. It is also contemplated that the link 78 may be disposed through the coupler 82. Specifically, the coupler 82 may include an aperture 94 and the link 78 passes through the aperture 94 within the coupler 82. As additionally illustrated in FIG. 5, a guide 96 may be mounted to the frame 52 and disposed about the link 78. The coupler 82 is slidably disposed within the guide 96 and the guide 96 is configured to guide the coupler 82 between a first position 98 and a second position 100. Additionally, the guide 96 includes a pair of openings 102 having the link 78 disposed through the guide 96 and the link 78 passing through the openings 102. It is contemplated that the aperture 94 of the coupler 82 aligns with the openings 102 of the guide 96 when the latch 80 is in the locked position 88 and the coupler 82 is in the first position 98. The coupler 82 is coupled to the guide 96 such that the coupler 82 engages the guide 96 and allows the coupler 82 to easily slide between the first position 98 and the second position 100 while the coupler 82 remains parallel. It is contemplated that the coupler 82 may be a single piece comprised of steel, aluminum or any other material as known by one of ordinary skill in the art.

Figure 7:
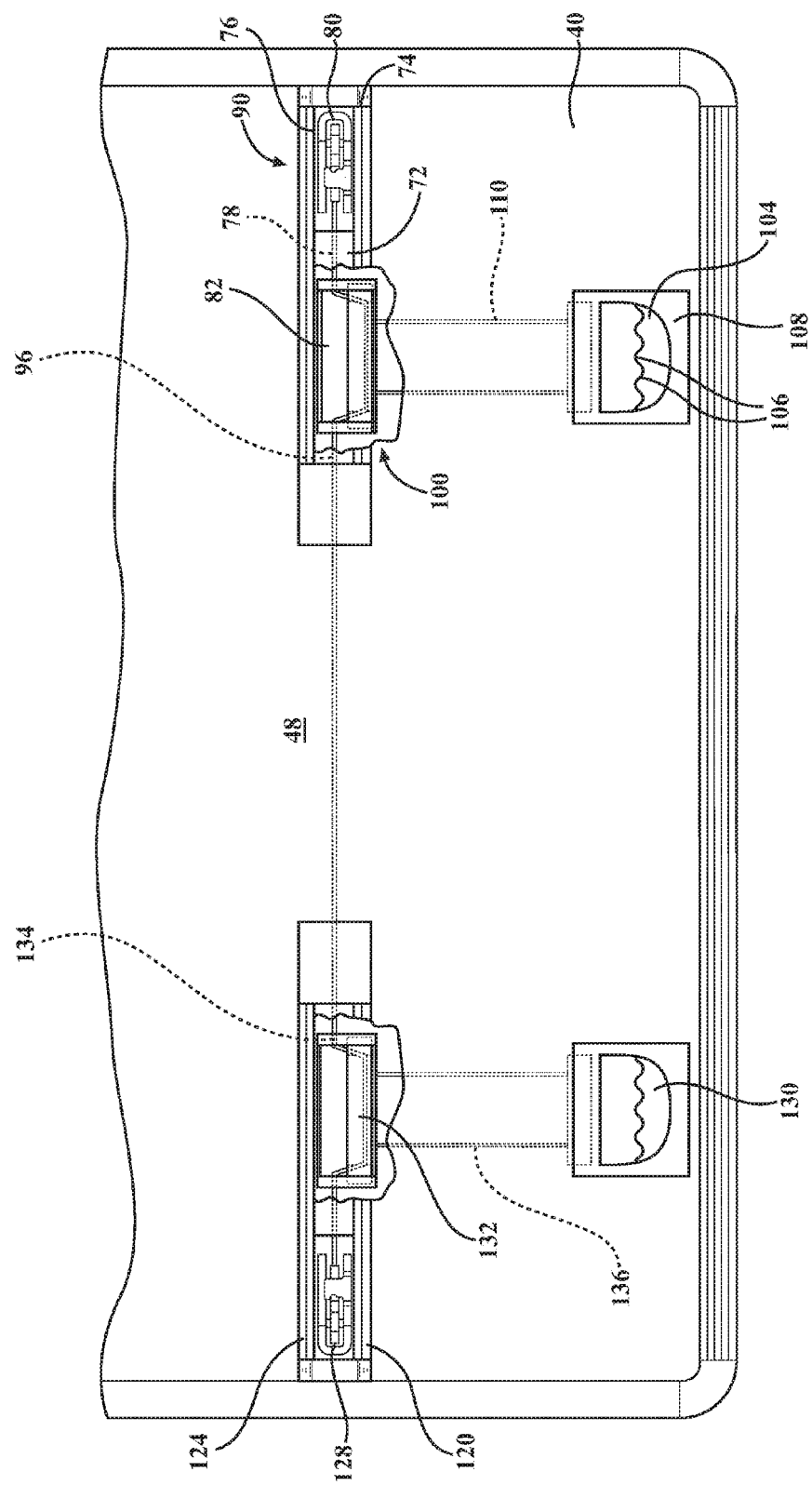
FIG. 7 is a planar view of a latch and a handle disposed in a pocket according to one embodiment.
Figure 8:
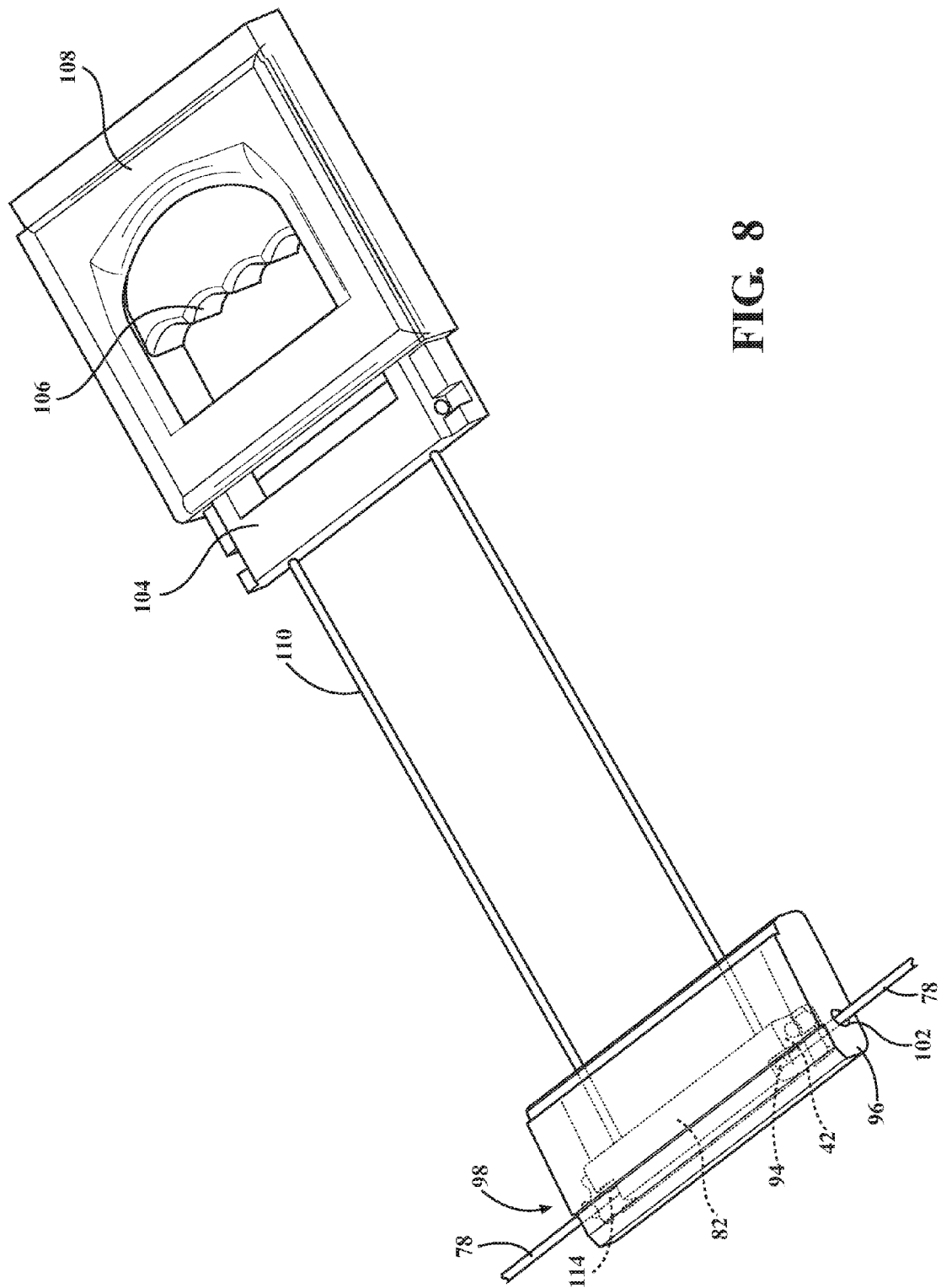
FIG. 8 is a perspective view of the handle and coupler in a first position.

Referring again to FIGS. 2 to 5, the coupler 82 may be additionally coupled to a handle 104 which is coupled to the frame 52. The handle can be mounted directly to the frame 52 or coupled to the frame 52 though the first sheet 46 or the second sheet 47. The handle 104 is disposed on the first section 40 of the cover 20. It is also contemplated that the handle 104 may be disposed on the second section 42 of the cover 20. More specifically, the handle 104 is disposed between the left side rail 54 and the first support rail 66 of the frame 52. Additionally, the handle 104 is disposed between the pocket 72 and the rear frame member 60. Moreover, the handle 104 is coupled to the latch in order to move the latch into the released position which disengages the striker. The handle 104 may be a handle 104 of any type as known by one of ordinary skill in the art and capable of moving the coupler 82 from the first position to the second position. The handle 104 may include curved portions 106, which may fit fingers of a user in order to ease the movement of the handle 104. It is also contemplated that the handle 104 may be a pull handle, a push handle, or any other type of handle as known by one of ordinary skill in the art. The handle 104 may also include a surrounding padded portion 108. The padded portion 108 may extend outward from the cover 20 such that when the cover 20 is in the folded position, the pocket 72 and the contents of the pocket 72, including the latch 80, the link 78 and coupler 82 are separated away from the second portion 42. The padded portion 108 of the handle 104 prevents the latch 80 or any other portion of the contents of the pocket 72 from being damaged or compressed when the cover 20 is in the folded position Referring now to FIGS. 7 to 9, the handle 104 is coupled to the coupler 82. It is contemplated that the handle 104 and the coupler 82 may be coupled together through a connector 110. The connector may be a cable and may include a conduit and a core element or may just include the core element. The connector 110 may be comprised of one or a plurality of connectors which extend from the coupler 82 to the handle 104. As illustrated in FIG. 8, the connector 110 comprises two connectors which extend from the handle 104 to the coupler 82. It is also contemplated that the two connectors of the connector 110 may be equidistantly disposed from a first side 112 and a second side 114 of the coupler 82.

Figure 9:
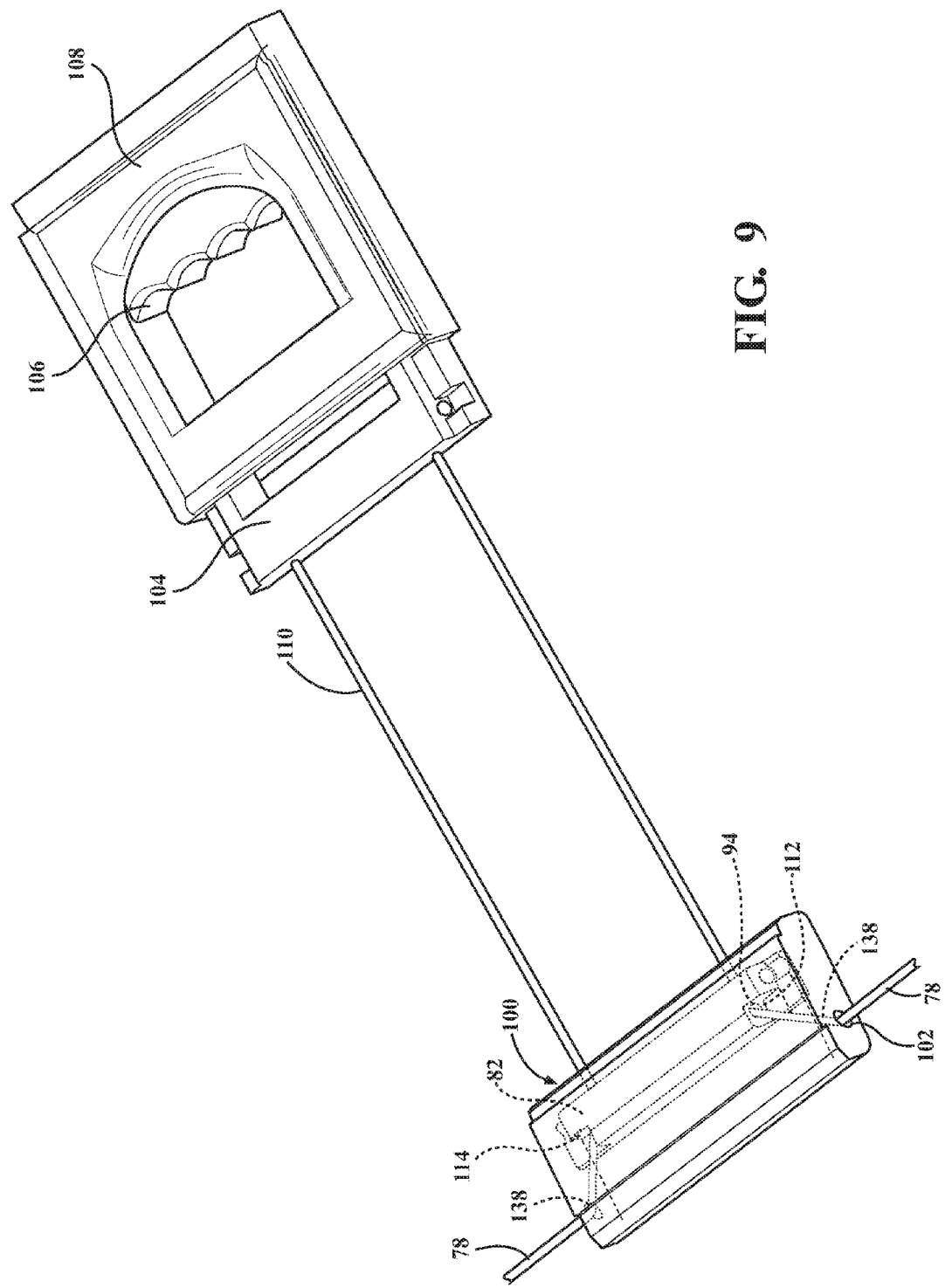
FIG. 9 is a perspective view of the handle and the coupler in a second position.
Figures 12, 13:
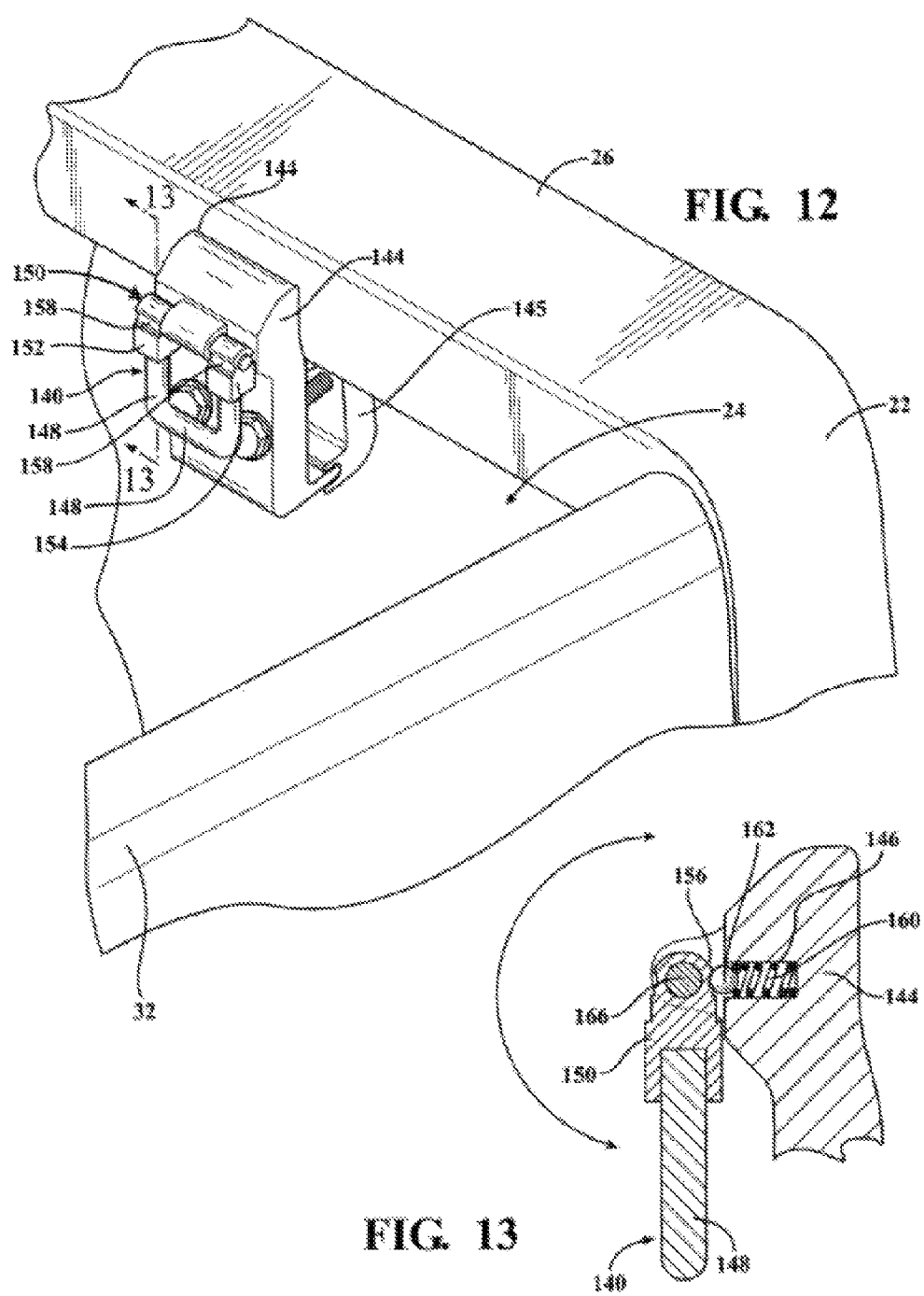
FIG. 12 is an enlarged view of the striker in a stowed position.
FIG. 13 is a side view of the striker taken along the line indicated in FIG. 12.

Additionally, as illustrated in FIGS. 8 to 9, the guide 96 may be mounted to the frame 52 and the coupler 82 may be adapted to fit in the guide 96. It is contemplated that the guide 96 may have ridges 116 on either side and a depression 118 in the center such that the coupler 82 engages each of the ridges 116 and maintains a parallel orientation while moving from the first position to the second position 110. The guide 96 is generally stationary and fixed to the frame 52 while the coupler 82 is a movable portion which moves in response to movement of the handle 104. Additionally, the link 78 is disposed through both the guide 96 and the coupler 82 where the guide 96 includes the opening 102 which is disposed completely through a top portion of the guide 96. The link 78 is disposed through one side of the opening 102 of the guide 96 and then engages and is disposed through the aperture 94 of the coupler 82 and exits the guide 96 through the opening 102 on the opposite side.

As illustrated in FIGS. 8 to 9, when the coupler 82 is in the first position 98, the opening 102 of the guide 96 is in line with the aperture 94 of the coupler 82. It is also contemplated that the coupler 82 may be abutting a top wall of the guide 96 when in the first position 98. When the coupler 82 is moved to the second position 100, the coupler 82 may abut a bottom wall of the guide 96.

Referring again to FIGS. 2 to 5 and FIGS. 14 to 15, the frame 52 may include a third panel 120 and a fourth panel 122 which may define a second pocket 124 along with second track 69 of the frame 52. Moreover, a second striker 126 may be adapted to be fixed to the cargo box 22 and a second latch 128 may be mounted to the frame 52. The second latch 128 additionally engages the second striker 126 when the cover 20 is in the closed position 36 to define the locked position 88 of the second latch 128. Moreover, a second handle 130 may be coupled to the second latch 128 and mounted to the frame 52 and a second coupler 132 may be disposed about the link 78 and coupled to the second handle 130. The second coupler 132 may again move from the first position 98 to the second position 100 in response to movement of at least one of the first handle 104 and second handle 130. It is also contemplated that the second latch 128 and the second coupler 132 may be disposed at least partially or completely within the second pocket 124.

The second latch 128, the second handle 130 and the second coupler 132 may include many of the features as described above with respect to the first latch 80, the first handle 104, and the first coupler 82. It is also contemplated that the second latch 128, the second handle 130 and the second coupler 132 may be identical, and arranged in mirror-image to the first latch 80, the first handle 104, and the first coupler 82. The second latch 128, the second coupler 132, and the second handle 130 are disposed between the second support rail 67 and the right side rail 56. Moreover, the handle 130 is disposed between the second pocket 124 and the rear frame member 60. The link 78 may extend between the latch 80 and the second latch 128 along the frame 52 and is at least partially disposed in the cavity 49. The link 78 may be continuous and extend at least partially through the first pocket 72, the cavity 49 and the second pocket 124 where the link 78 is coupled to the second latch 128. Even more specifically, the core element extends into each pocket with both the conduit and the core element being disposed in the cavity.

As illustrated in FIGS. 2 and 3, the first pocket 72 and the second pocket 124 are separated from one another by at least a portion of the cavity 49. It is also contemplated that a second guide 134 may be mounted to the frame and disposed about the link 78 where the second coupler 132 is slidably disposed with the second guide 134 in order to guide the second coupler 132 between the first position 98 and the second position 100. Again, the second guide 134 may include many of the features as described above with respect to the first guide 96. It is also contemplated that the second guide 134 may be identical to the first guide 96. An additional connector 136 may also be coupled between the second handle 130 and the second coupler 132, similar or identical to the connector 110 described above.

Referring now to FIGS. 10 to 13, the striker 86 is adapted to be fixed to the cargo box 22 and is capable of moving between a stowed position 140 and an operational position 142. The striker 86 is coupled to a support housing 144 and the support housing 144 is adapted to be fixed to the cargo box 22. The support housing is coupled with a clamp 145 for orientating the striker 86 on the cargo box 22. The clamp 145 may be any type of clamp as known by one of ordinary skill in the art. It is also contemplated that the support housing 144 and the clamp 145 are integrated with each other. A biasing device is disposed between the support housing and the striker. The biasing device 146 automatically holds the striker 86 in the stowed position 140 or the operational position 142. It is contemplated that the biasing device 146 may be at least partially disposed in the support housing.

Referring still to FIGS. 10 to 13, the striker 86 may include an upper portion 148 and a lower portion 150. The lower portion 150 may be comprised of a first piece 152 and a second piece 154. As illustrated in FIG. 10, the upper portion 148 is generally U-shaped and one end of the upper portion 148 is engaged with the first piece 152 of the lower portion 150 and the opposite end of the upper portion 148 is engaged with the second piece 154 of the lower portion 150. Each of the first piece 152 and the second piece 154 include at least a first detent 156 and a second detent 158 with the first detent 156 engaging the biasing device 146 when the striker 86 is in the stowed position 140 and the second detent 158 engaging the biasing device 146 when the striker 86 is in the operational position 142. The biasing device 146 includes a spring 160 and a ball 162. The first detent 156 and second detent 158 are configured to engage the ball 162 when the striker 86 is in the stowed position 140 and in the operational position 142 respectively in order to hold the striker 86 in the desired position.

When the cover 20 is in the closed position 36, the cover 20 defines a plane 164. When the striker 86 is in the stowed position 140, the striker 86 is disposed completely below the plane 164. When the striker 86 is moved to the operational position 142, the striker 86 is at least partially disposed above the plane 164. It is contemplated that the striker 86 pivots about a pivot member 166 between the operational position 142 and the stowed position 140. The pivot member 166 may be a pin, which is disposed through both the first piece 152 and the second piece 154 of the lower portion 150 or may be any other pivot mechanism as known by one of ordinary skill in the art. When the striker 86 is in the operational position 142, the striker 86 is configured to be engaged with the cover 20 and specifically, engaged with the latch 80 when the cover 20 is in the closed position 36. Once the latch 80 is disengaged from the striker 86, and the cover 20 is in the open position 92, the striker 86 may then be moved by a user to the stowed position 140. The stowed position 140 hides the striker 86 such that a uniform look is given to the cargo box 22. Additionally, the stowed position 140 prevents a user or any cargo from getting inadvertently stuck on the striker 86.

Figure 7A:
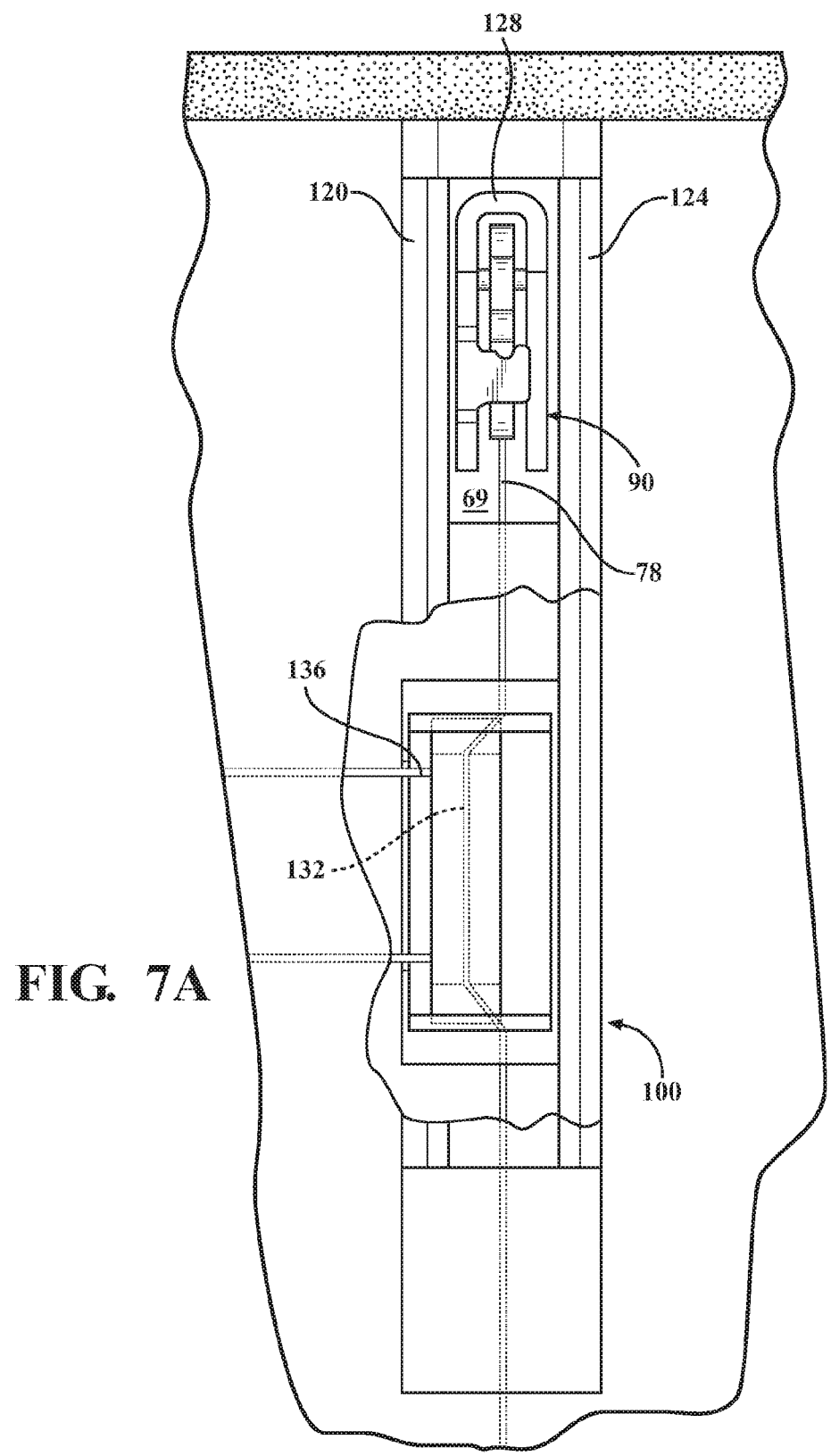
FIG. 7A is an enlarged view of one of the pockets shown in FIG. 7.

Referring now to FIGS. 14 and 15, in operation, when the cover 20 is in the closed position 36 a user moves one of the first handle 104 or the second handle 130 which in turn pulls the respective connector 110 engaged to the respective coupler 82 and pulls the coupler 82 down to the bottom wall of the guide 96 and into the second position 100. By moving the one of the first handle 104 or second handle 130, the link 78 is pulled by the respective coupler 82 at an angle. As illustrated in FIGS. 7 and 7A the angle is a 45° angle but may be any other angle as desired. The additional tension in the link 78 caused by the coupler 82 moving to the second position 100 moves both the first latch 80 and second latch 128 from the locked position 88 to the released position 90. Moving the first handle 104 or the second handle 130 will move both the first latch 80 and the second latch 128 from the locked position 88 to the released position 90. When the cover 20 is in the closed position 36, the link 78 is generally straight and extends from the first latch 80 through the first coupler 82 along the frame 52 through the second coupler 132 and couples the second latch 128. Once one of the first handle 104 or second handle 130 is moved, the respective first coupler 82 or second coupler 132 moves from the first position 98 to the second position 100 such that the link 78 forces the first latch 80 and the second latch 128 into the released position 90. When the first latch 80 and the second latch 128 are in the released position 90, the first latch 80 and the second latch 128 disengage the first striker 86 and the second striker 126 respectively and the cover 20 is then in the open position 92. The user can then move the cover into a fully folded position, if desired. The link 78 may have at least one, and as illustrated in FIGS. 7 and 7A, two turning points 138 which are disposed on either side of the coupler 82. At the turning point 98 after the handle 104 is moved, the link 78 may be disposed at approximately a 45° angle or may be any other angle as desired by one of ordinary skill in the art which will provide enough tension to the link 78 to move both the first latch 80 and the second latch 128 into the released position 90. It is additionally contemplated that a portion of the link 72 may be disposed within a plastic tube or jacket which may be nested into the cover and abut the frame. The plastic tube or jacket will prevent debris or liquid from engaging with the link 72.

Referring now to the embodiment illustrated in FIGS. 16 and 17, the variation illustrated in FIGS. 16 and 17 may include many similar features as described above with respect to the variation illustrated in FIGS. 1 to 15 including, but not limited to, a cover 200 disposed over and adapted to a cargo box 202 when the cover 200 is in a closed position 204, a latch 206 which is coupled to the cover 200, a frame 208, and a striker 210 which is adapted to be fixed to the cargo box 202. The latch 206 engages the striker 210 when the cover 200 is in the closed position 204 to define a locked position 219 of the latch 206. Additionally, the cover 200 includes a first sheet 212, which is coupled to the frame 208 and defines a first plane 209, and a second sheet 214 which is additionally coupled to the frame 208 and defines a second plane 211, and the first sheet 212, the second sheet 214, define a space 215 therebetween. The first sheet 212 and the second sheet 214 are disposed parallel to one another. A handle 218 may also be coupled to the latch 206 in order to move the latch 206 into a released position, which disengages the striker 210. However, in the embodiment illustrated in FIGS. 16 and 17, the latch 206 and the handle 218 are completely disposed in the space 215. The latch 206 may include many similar features as described above with respect to the latch 80 shown in embodiments of FIGS. 1 to 9. Additionally, the latch 206 may move linearly within the pocket 216. It is contemplated that the handle 218 may move the latch 206 linearly when the handle 218 is moved in order to move the latch 206 into the released position 220 which disengages the striker 210. Again, the handle 218 may be any type of handle as known by one of ordinary skill in the art. Additionally, the embodiment illustrated in FIGS. 16 and 17 includes a link 222. The link 222 may include similar features as described above with respect to the link 78 shown in embodiments described in FIGS. 1 to 9. Moreover, as illustrated in FIGS. 16 and 17 the link 222 is completely disposed in the space 215. The frame 208 also defines a pocket 216 within the space 215 and the latch 206 is disposed in the pocket 216.

Additionally, the frame 208 defines a second pocket 228, within the space 215. It is contemplated that the system also includes a second striker 230 which is adapted to be fixed to the cargo box 202. Moreover, a second latch 232 is mounted to the frame 208 and a second handle 234 is coupled to the latch 206. The second latch 232 engages the second striker 230 when the cover 200 is in the closed position 204 to define the locked position 219. As illustrated in FIGS. 16 and 17, the second latch 232 and the second handle 234 may be completely disposed in the second pocket 228 within the space 215. The link 222 is coupled to the first latch 206 disposed in the first pocket 216 through the cavity 246, including portions disposed between the first pocket 216 and the second pocket 228 within the space 215, and may extend through the first pocket 216 and into the second pocket 228 where the link 222 engages the second latch 232 along the frame 208 within the space 215. The link 222 is also coupled to the first handle 218 and the second handle 234 such that a user may move one or more of the first handle 218 and the second handle 234 in order to move both the first latch 206 and the second latch 232 into the released position 220.

Continuing with the embodiment in FIGS. 16 and 17, the striker 210 may be a similar striker 86 as described above in embodiments 1 to 15. However, it is also contemplated that the striker 210 may be a curved striker fixed to the cargo box 202. The striker 210 may include a straight portion 236 extending from the cargo box 202 and a curved portion 238 which may engage the latch 206. Moreover, the striker 210 may be a generally rectangular shaped striker welded or otherwise fixed to the cargo box 202. The generally rectangular shaped striker may include at least one opening which may be configured to fit at least a portion of the latch 206. It is also contemplated that the striker 210 may be a striker of any other shape or type as known by one of ordinary skill in the art. Moreover, as described above, the latch 206 may be a laterally moving latch which may be configured to move within the pocket 216. The latch 206 may be a latch 80 as described above with respect to the embodiment shown in FIGS. 1-6, or may include a catch surface 240 which engages the striker 210 when the cover 200 is in the closed position 204. When the handle 218 is moved, the latch 206 may be moved linearly such that the catch surface 240 is moved away from the striker 210 and disengages the striker 210 to allow the cover into an open position 242. Moreover, a biasing member 244 may be coupled to the latch 206. The biasing member 244 may bias the latch 206 towards the locked position 219. Additionally, the handle 218 may be a handle 104 similarly described in embodiments shown in FIGS. 1 to 9 described above or the handle 218 may be any type of handle including a pull handle, a twist handle, or any other handle as known by one of ordinary skill in the art. The handle 218 is configured to be coupled to the frame 208 and disposed in the pocket 216. In operation, a user moves one of the first handle 218 or the second handle 234 which engages the link 222 to move relative to the frame 208 such that both the first latch 206 and the second latch 232 are moved laterally within the first pocket 216 or the second pocket 228 respectively in order to move the first latch 206 and the second latch 232 into the released position 220 which disengages the first striker 210 and the second striker 230 from the first latch 206 and the second latch 232, respectively, and moves the cover 200 to the open position 242. When closing the cover 200, a user pushes down on the cover 200 such that the first striker 210 and the second striker 230 engage the latch 232, respectively, and the cover 200 is in the closed position 204.

In summary, the tonneau cover system of FIGS. 16 and 17 is for a vehicle having a cargo box. A striker adapted to be fixed to the cargo box. Additionally, the system includes a cover adapted to be disposed over the cargo box when in a closed position. The cover includes a rigid frame and a latch mounted to the frame. The latch engages the striker when the cover is in the closed position to define a locked position of the latch. Additionally, the cover includes a handle coupled to the latch to move the latch into a released position disengaging the striker. A first sheet is coupled to the frame defining a first plane. A second sheet is coupled to the frame defining a second plane with the planes defining a space there between. The latch and the handle are completely disposed within the space between the planes.

Continuing with the summary of the tonneau cover system of FIGS. 16 and 17, the latch may move linearly within the space. Moreover, the first sheet and the second sheet are disposed parallel to one another. Additionally, the link is coupled to the handle and to the latch. The link may be completely disposed in the space. The biasing member is coupled to the latch. The tonneau cover system of FIGS. 16 and 17 may also include the second striker adapted to be fixed to the cargo box. The second latch is mounted to the frame with the second latch engaging the second striker when the cover is in the closed position to define the locked position of the second latch. The second handle is coupled to the latch to move at least one of the first latch and the second latch into the released position. The second latch and the second handle may be completely disposed within the space. The link is coupled to the latch and the second latch along the frame within the space. The first latch and the second latch move from the locked position to the released position in response to movement of one of the handle and the second handle with the link moving relative to the frame to facilitate movement of the latch and the second latch into the released position. Moreover, the frame further defines the pocket and the latch may be disposed in the pocket. The frame further defines the second pocket and the second latch may be disposed in the second pocket.

What is claimed is:

1. A tonneau cover system for a vehicle having a cargo box comprising:
    a striker adapted to be fixed to the cargo box;
    a cover adapted to be disposed over the cargo box when in a closed position with an exterior surface spaced from an interior surface and a cavity between the exterior and interior surfaces, said cover comprising:
        a rigid frame;
        a latch disposed in said cavity and movable in the cavity between a locked position and a released position mounted to said frame and engaging said striker when said cover is in said closed position to define a locked position of said latch;
        a link disposed in said cavity; and
        a handle disposed in said cavity and operably coupled to said latch via said link, said handle being movable in the cavity to move said latch into a released position disengaging said striker;
        wherein said handle, said link and said latch remain disposed in said cavity during movement of the handle and corresponding movement of the latch between the locked and released positions.

2. The tonneau cover system of claim 1, wherein said cavity includes a latch pocket and said frame at least partially defines said latch pocket with said latch mounted to said frame within said latch pocket.

3. The tonneau cover system of claim 2, wherein said frame further includes a first panel and a second panel with said panels further defining said latch pocket.

4. The tonneau cover system of claim 1, wherein said link is completely disposed within said cavity.

5. The tonneau cover system of claim 4, wherein a coupler is disposed about said link and in said latch pocket, and said coupler is movable with said link in response to movement of said handle to facilitate movement of said latch into said released position.

6. The tonneau cover system of claim 1, wherein said cavity includes a handle pocket and said handle is disposed within said handle pocket.

7. The tonneau cover system of claim 1, wherein an exterior sheet comprises said exterior surface and an interior sheet comprises said interior surface and a core material extending between the exterior and interior sheets is disposed at least partially in said cavity.

8. The tonneau cover system of claim 1, further comprising:
    a second striker adapted to be fixed to the cargo box;
    a second latch disposed in said cavity and movable in the cavity between a locked position and a released position, mounted to said frame with said second latch engaging said second striker when said cover is in said closed position to define a locked position of said second latch; and
    a second handle disposed in said cavity and operably coupled to said second latch via said link, said second handle being movable in the cavity to move said second latch into a released position disengaging said second striker in response to movement of either one, or both of said handle and said second handle;
    wherein said second handle, said link and said second latch remain disposed in said cavity during movement of said second handle and corresponding movement of said latch between the locked and released positions, and wherein both said latch and said second latch are movable between the respective locked and released positions in response to movement of either one, or both of said first handle and said second handle.

9. The tonneau cover system of claim 8, wherein said link extends between said latch and said second latch at least partially along said frame.

10. The tonneau cover system of claim 8, wherein said cavity includes a latch pocket and said frame at least partially defines a latch pocket with said latch mounted to said frame within said latch pocket, and said cavity includes a second latch pocket with said second latch mounted to said frame within said second latch pocket.

11. The tonneau cover system of claim 10, wherein said cavity includes a handle pocket and a second handle pocket, and said handle is disposed within said handle pocket and said second handle is disposed within said second handle pocket.

12. The tonneau cover system of claim 10, wherein said link extends between the latch pocket and second latch pocket and said link extends at least partially through said latch pocket and said second latch pocket.

13. The tonneau cover system of claim 11, wherein said latch pocket and said handle pocket are by spaced from each other within said cavity.

14. The tonneau cover system of claim 13, wherein said second latch pocket and said second handle pocket are spaced from each other within the cavity.

15. The tonneau cover system of claim 10, wherein a coupler is disposed about said link and in said latch pocket and a second coupler is disposed about said link and in said second latch pocket, and both said coupler and said second coupler move with said link in response to movement of either one, or both, of said handle and said second handle to facilitate movement of said latch and said second latch into said released position.

16. The tonneau cover system of claim 5, further comprising a guide mounted to said frame and disposed about said link with said coupler slidably engaged with said guide to guide said coupler during movement with said link in response to movement of said handle to facilitate movement of said latch into said released position.

17. The tonneau cover system of claim 16, wherein said link is disposed completely through said guide and said coupler.

18. The tonneau cover system of claim 16, wherein said coupler includes an aperture with said link passing through said aperture within said coupler.

19. The tonneau cover system of claim 18, wherein said guide includes a pair of openings with said link passing through said openings.

20. The tonneau cover system of claim 19, wherein said aperture of said coupler aligns with said openings of said guide when said coupler is in said first position.

21. The tonneau cover system of claim 5, wherein said handle is operably coupled to said latch via said link via a connector having a first end and a second end with said first end coupled to said handle and said second end coupled to said coupler to provide a direct connection between said handle and said coupler such that moving said handle moves said coupler and, in turn, said link in response to movement of said handle to facilitate movement of said latch into said released position.

22. The tonneau cover system of claim 21, wherein said connector comprises a plurality of connectors.

23. The tonneau cover system of claim 21, wherein said connector and said link comprise cables.

24. The tonneau cover system of claim 1, wherein said link comprises a cable.

25. The tonneau cover system of claim 8, wherein said frame comprises a right side rail, a left side rail, a front rail, and a rear rail at least partially defining a rear section of said cover.

26. The tonneau cover system of claim 25, wherein said latch, said link, and said handle are disposed on said rear section of said cover.

27. The tonneau cover system of claim 25, wherein said frame further comprises a first support rail and a second support rail with said latch, and said handle disposed between said first support rail and said left side rail with said second latch and said second handle disposed between said second support rail and said right side rail.

28. A tonneau cover system for a vehicle having a cargo box comprising: a cover adapted to be disposed over the cargo box when in a closed position; a latch coupled to said cover; a support housing adapted to be mounted to the cargo box; a striker coupled to said support housing with said striker being movable between an operational position in which said latch is engageable with said striker when said cover is in said closed position and a stowed position in which said latch is not encaceable with said striker when said cover is in said closed position; and a biasing device disposed between said support housing and said striker to automatically hold said striker in each of said positions.

29. The tonneau cover system of claim 28, wherein said cover defines a plane when said cover is in said closed position and said striker is completely disposed below said plane when said striker is in said stowed position.

30. The tonneau cover system of claim 29, wherein said striker is at least partially disposed above said plane when said striker is in said operational position.

31. The tonneau cover system of claim 28, further including a clamp with said support housing coupled to said clamp.

32. The tonneau cover system of claim 31, wherein said clamp and said support housing are integrated with each other.

33. The tonneau cover system of claim 28, wherein said biasing device is at least partially disposed in said support housing.

34. The tonneau cover system of claim 28, further comprising a pivot member coupled to said striker.

35. The tonneau cover system of claim 34, wherein said striker pivots about said pivot member between said operational position and said stowed position.

36. The tonneau cover system of claim 34, wherein said striker includes a lower portion coupled to said pivot member and an upper portion configured to engage said cover when said cover is in said closed position with said lower portion including a first piece and a second piece.

37. The tonneau cover system of claim 36, wherein said upper portion is a U-shaped member having a first end coupled to said first piece and a second end coupled to said second piece.

38. The tonneau cover system of claim 36, wherein said pivot member is a pin disposed through both said first piece and said second piece of said lower portion.

39. The tonneau cover system of claim 36, wherein said lower portion of said striker includes at least a first detent and a second detent.

40. The tonneau cover system 39, wherein said biasing device engages said first detent when said striker is in said operational position and said biasing device engages said second detent when said striker is in said stowed position.

41. The tonneau cover system of claim 28, wherein said biasing device comprises a ball and a spring.

* * * * *